United States Patent
Hsu

(10) Patent No.: US 7,145,380 B2
(45) Date of Patent: Dec. 5, 2006

(54) LOW POWER CONSUMED AND SMALL CIRCUIT AREA OCCUPIED TEMPERATURE SENSOR

(75) Inventor: Jenshou Hsu, Hsin-Chu (TW)

(73) Assignee: Etron Technology, Inc., Hsin-Chu (TW)

( * ) Notice: Subject to any disclaimer, the term of this patent is extended or adjusted under 35 U.S.C. 154(b) by 222 days.

(21) Appl. No.: 10/950,779

(22) Filed: Sep. 27, 2004

(65) Prior Publication Data

US 2006/0071733 A1    Apr. 6, 2006

(51) Int. Cl.
*H01L 35/00* (2006.01)
*H01L 37/00* (2006.01)
*H03K 3/42* (2006.01)
*H03K 17/78* (2006.01)

(52) U.S. Cl. ..................................... 327/512
(58) Field of Classification Search ................ 327/512, 327/513
See application file for complete search history.

(56) References Cited

U.S. PATENT DOCUMENTS

| | | | |
|---|---|---|---|
| 5,835,553 A | 11/1998 | Suzuki | 377/25 |
| 6,019,508 A | 2/2000 | Lien | 374/178 |
| 6,078,208 A | 6/2000 | Nolan et al. | 327/512 |
| 6,310,510 B1 * | 10/2001 | Goldman et al. | 327/538 |

* cited by examiner

*Primary Examiner*—David Mis
(74) *Attorney, Agent, or Firm*—Saile Ackerman LLC; Stephen B. Ackerman

(57) ABSTRACT

A circuit and a method are provided for sensing integrated circuit temperatures using low power and small area. This temperature sensor is more accurate than other temperature sensors, since it uses a reference voltage which has a steeper slope versus temperature. Also, this temperature sensor dissipates lower power than conventional designs, since it only requires two voltage comparators. This is accomplished via a unique transfer gate voltage selection system, which allows two comparators to be reused during different temperature control state modes. The simple design can be scaled to add to the number of temperatures to be detected.

32 Claims, 7 Drawing Sheets

| Original | | A1 | A2 | A3 | |
|---|---|---|---|---|---|
| modified | S0 | A1' | A2' | | |
| | S1 | | A1' | A2' | |
| | S2 | | | A1' | A2' |
| | S3 | | | | A1' | A2' |

— 471

| | SS0 | SS1 | SS2 | SS3 |
|---|---|---|---|---|
| S0 | 1 | 0 | 0 | 0 |
| S1 | 0 | 1 | 0 | 0 |
| S2 | 0 | 0 | 1 | 0 |
| S3 | 0 | 0 | 0 | 1 |

— 475

| Original | | VT1 | VT2 | VT3 | |
|---|---|---|---|---|---|
| modified | S0 | VT1' | VT2' | | |
| | S1 | | VT1' | VT2' | |
| | S2 | | | VT1' | VT2' |
| | S3 | | | | VT1' | VT2' |

— 472

| | R1T1 | R2T1 | R3T1 | R1T2 | R2T2 | R3T2 |
|---|---|---|---|---|---|---|
| S0 | 1 | 0 | 0 | 1 | 0 | 0 |
| S1 | 1 | 0 | 0 | 0 | 1 | 0 |
| S2 | 0 | 1 | 0 | 0 | 0 | 1 |
| S3 | 0 | 0 | 1 | 0 | 0 | 1 |

— 473

| | VR1" | VR2" |
|---|---|---|
| S0 | VR1' | VR1' |
| S1 | VR1' | VR2' |
| S2 | VR2' | VR3' |
| S3 | VR3' | VR3' |

— 474

*FIG. 4b*

LOW POWER CONSUMED AND SMALL CIRCUIT AREA OCCUPIED TEMPERATURE SENSOR

BACKGROUND OF THE INVENTION

1. Field of the Invention

The present invention generally relates to imbedding temperature-sensing circuits into integrated circuits. More particularly, this invention relates to building more accurate, lower power, and smaller integrated circuit area temperature sensors.

2. Description of the Prior Art

Temperature sensors are used to control various integrated circuit functions to control various integrated circuit functions. These dynamic functions include random access memories (DRAM) refresh frequency and delay chain delay time, both of which vary with temperature. On-chip temperature sensors are used to regulate or vary the amount of DRAM refresh applied as a function of temperature. Similarly, on-chip temperature sensors are used to regulate or stabilize circuit delay time variations, which occur. This stabilization of circuit delay time is critical for circuits, which depend on the accuracy of circuit delay for correct circuit applications, such as circuit delay chain circuits. In addition, on-chip temperature sensors are desired in order to implement digital thermometer applications.

Since temperature sensors are sharing parts of integrated circuits with other integrated functions, it is important that these integrated temperature sensors occupy minimal chip area and consume minimal chip power. In addition, another important design parameter for integrated temperature sensors are the accuracy of the temperature measurement itself.

FIG. 1a shows a prior art diagram of voltage versus temperature. FIG. 1a graphs voltage versus temperature for 4 nodes pictured in the circuit of FIG. 1c. As shown in FIG. 1a, the intersection of the VR1 straight-line graph and the Vbe2 curve occurs at temperature, T1. VR1 is the voltage at the top node of resistor, R1 in FIG. 1c. Vbe2 is the voltage across transistor, Q2. Voltage, Vbe2, is the reference voltage, VREF=Vbe2, in FIG. 1c. VR2 is the voltage at the top node of resistor, R2, in FIG. 1c.

FIG. 1c shows Vbe2 and VR1 as inputs to a comparator amplifier 110. FIG. 1c shows Vbe2 and VR2 as inputs to a comparator amplifier 120. FIG. 1c shows Vbe2 and VR3 as inputs to a comparator amplifier 130. VR3 is the voltage at the top node of resistor, R3, in FIG. 1c.

In FIG. 1a, if VR1 is larger than Vbe2, then VT1 will be non-zero. A non-zero VT1 indicates that the circuit of FIG. 1c detected a temperature range above T1 as shown in FIG. 1b.

In FIG. 1a, if VR2 is larger than Vbe2, then VT2 will be non-zero. A non-zero VT2 indicates that the circuit of FIG. 1c detected a temperature range above T2 as shown in FIG. 1b.

In FIG. 1a, if VR3 is larger than Vbe2, then VT3 will be non-zero. A non-zero VT3 indicates that the circuit of FIG. 1c detected a temperature range above T3 as shown in FIG. 1b.

U.S. Pat. No. 6,078,208 (Nolan et al.) describes a precision temperature sensor which produces a clock frequency which varies over wide variations of ambient temperature. The circuit has an oscillation generator, two independent current generators, a reference oscillator and a frequency counter. The outputs of the two independent current generators are combined to provide an approximately linear capacitor charging current which is directly proportional to changes in temperature. The capacitor charging current is used to drive the oscillation generator which outputs a clock frequency that is linearly dependent on temperature with determinable slope and intercept. The frequency counter compares the output of the oscillation generator with the reference oscillator to compute a digital value for temperature.

U.S. Pat. No. 6,019,508 (Lien) discloses an integrated temperature sensor circuit. This circuit comprises two different current sources multiplexed using switches which are controlled by clocks having opposite phases. A first voltage is developed on a capacitor during a first clock phase and a second voltage is developed on the capacitor during the second clock phase. A second capacitor is coupled between the input and output of an operational amplifier. The second capacitor is discharged during the first clock phase and is charged during the second clock phase. Since the second voltage is dependent on temperature, the voltage at the output of the operational amplifier is dependent on the temperature and the ratio of the two capacitors.

U.S. Pat. No. 5,835,553 (Suzuki) describes a temperature sensor circuit. This circuit includes a pulse source for generating a count pulse and a resistor having a resistance changing dependently upon a temperature change. The temperature detecting circuit is designed to convert the change of the resistance of the resistor responding to the temperature change, into a number which represents the number pulses counted. A counter counts the count signal and accumulates a count value for each temperature-measuring signal so as to hold the accumulated count value. The counter outputs the accumulated count value in response to a reset signal having a second frequency lower than the first frequency.

SUMMARY OF THE INVENTION

It is therefore an object of the present invention to provide circuit and a method for sensing integrated circuit temperatures using low power and small area. It is further an object of this invention to provide a temperature sensor which is more accurate than the prior art and which can be scaled to add to the number of temperatures to be detected.

The objects of this invention are achieved by a circuit for measuring the temperature of an integrated circuit which includes the temperature sensor circuit. The temperature sensor circuit comprises a current mirror reference circuit which produces a reference voltage and an amplifier for reference voltage multiplying the reference voltage. The amplifier outputs a multiplied reference voltage, which is used by a bank of voltage comparators. The multiplied reference voltage provides a minus input to the voltage comparators. The plus inputs to the voltage comparators are provided by a current mirror output circuit which generates multiple voltage levels.

The bank of voltage comparators is comprised of a first voltage comparator whose minus input is the output of the reference voltage amplifier and whose plus input is from the first node of the first output resistor, and whose output is transited and indicates a lowest absolute temperature has been detected. A second voltage comparator whose minus input is the output of the reference voltage amplifier and whose plus input is from the first node of the second output resistor, and whose output is transited and indicates a second lowest absolute temperature has been detected. A third voltage comparator whose minus input is the output of the reference voltage amplifier and whose plus input is from the first node of the third output resistor, and whose output is transited and indicates a third lowest absolute temperature has been detected.

The voltage at the first node of the first output resistor is directly proportional to the lowest absolute temperature of a semiconductor die containing the temperature sensor circuit. A voltage at the first node of the second output resistor is directly proportional to the second lowest absolute temperature of the semiconductor die containing the temperature sensor circuit. A voltage at the first node of the third output resistor is directly proportional to the third lowest absolute temperature of the semiconductor die containing the temperature sensor circuit.

The above and other objects, features and advantages of the present invention will be better understood from the following detailed description taken in conjunction with the accompanying drawings.

BRIEF DESCRIPTION OF THE DRAWINGS

FIG. 1a is a prior art voltage versus temperature graph showing intersection of resistor voltages and a reference voltage.

FIG. 1b is a prior art voltage vs. temperature graph showing temperature results.

FIG. 4b shows tables which summarize the second embodiment of this invention.

DESCRIPTION OF THE PREFERRED EMBODIMENT

Figure 1C:
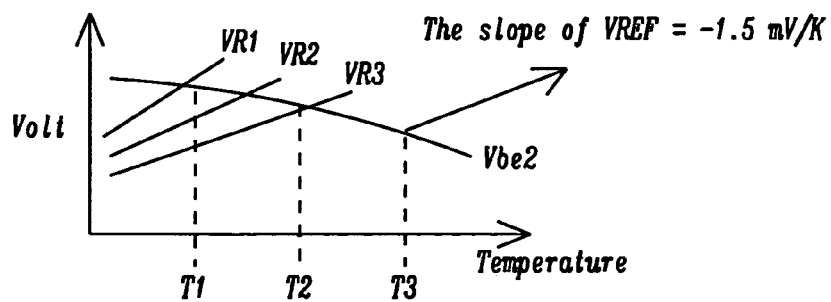
FIG. 1c shows a proposed basic temperature sensor circuit.
Figure 1C:
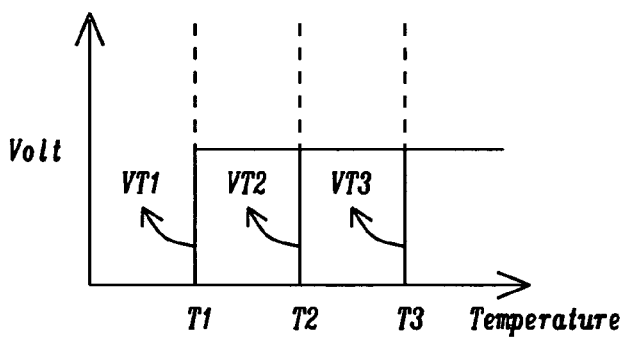
Figure 1C:
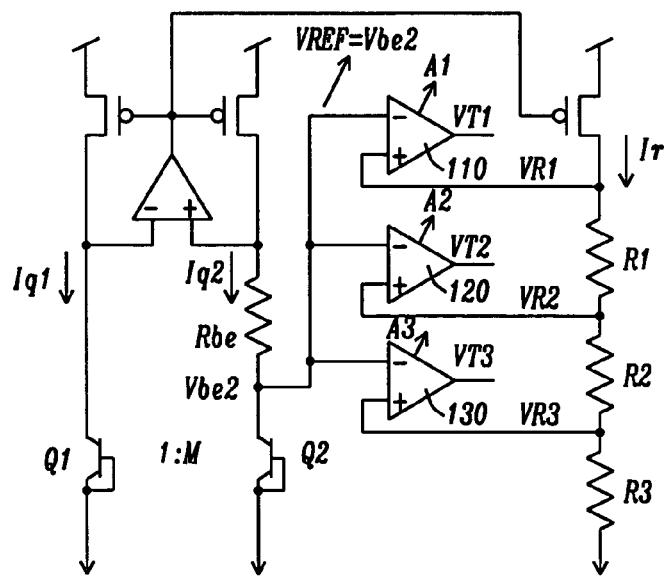
Figure 2A:
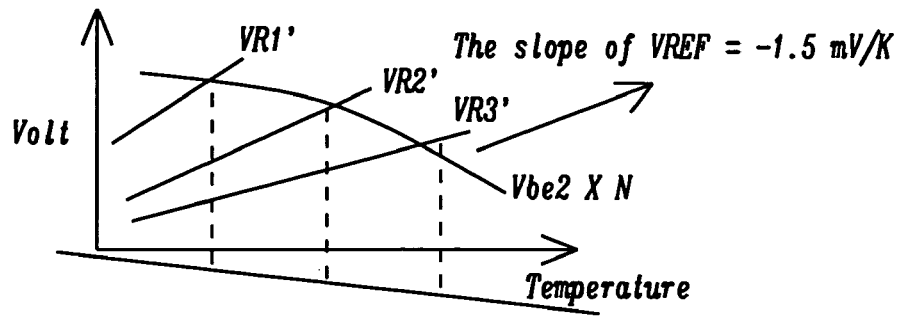
FIG. 2a is a voltage versus temperature graph showing intersection of resistor voltages and a reference voltage for the first embodiment of this invention.
Figure 2B:
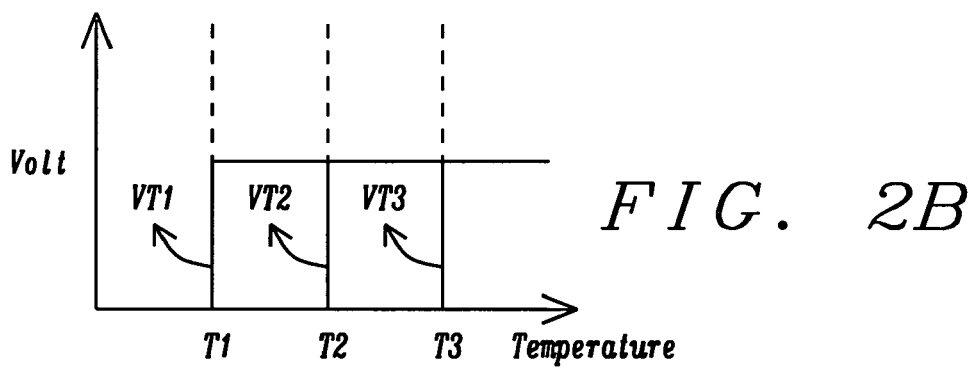
FIG. 2b is a voltage vs. temperature graph showing temperature-measuring results.
Figure 2C:
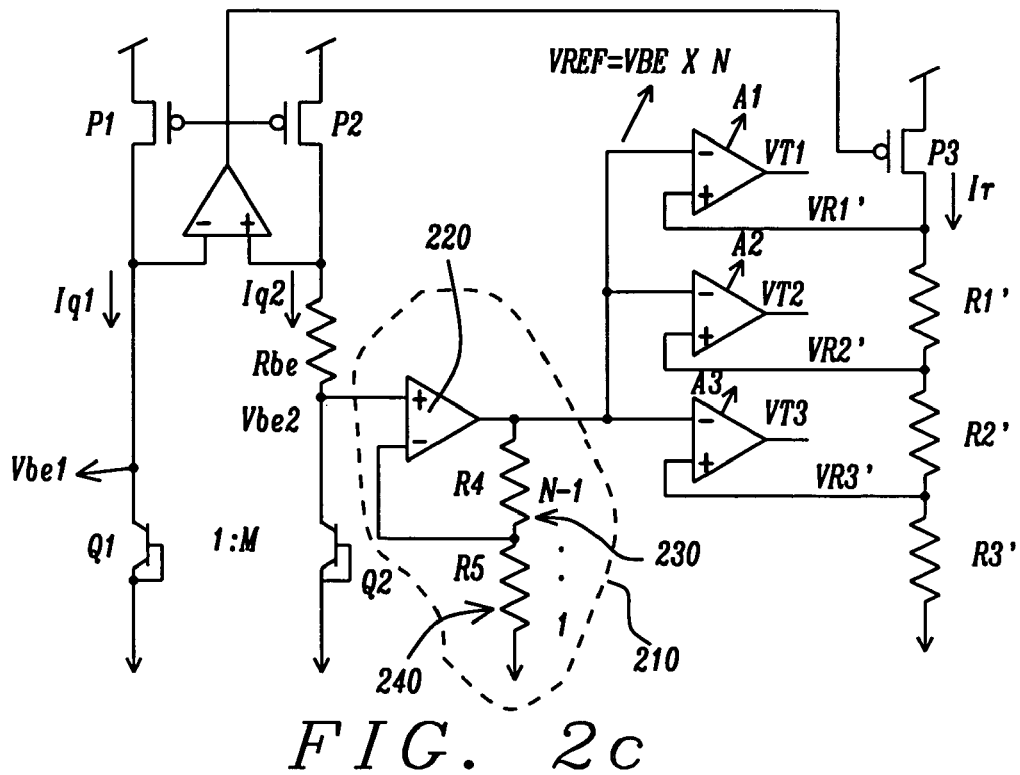
FIG. 2c shows a temperature sensor circuit, a first embodiment of this invention.

A first embodiment of this invention is shown in FIG. 2c. The circuit in FIG. 2c has three P-channel metal oxide semiconductor (PMOS) devices, P1, P2, and P3 which perform a current mirror function similar to the circuit of FIG. 1c. Also, the circuit of FIG. 2c is similar to the circuit of FIG. 1c except for the insertion of the circuitry labeled 210 in FIG. 2c. The new circuitry 210 amplifies its input, which is Vbe2, by the factor N. The value (N−1) is the ratio of resistor 230 to resistor 240. For example, if we need to multiply Vbe2 by 5, N−1=5−1=4. Therefore, values of R4 and R5 are chosen, which produce a ratio of R4/R5=4/1. If R5=1 Kilo ohm, R4=4 kilo ohm. In FIG. 2c, amplifier 220 has Vbe2 for the plus input and the feedback input as the minus input. The output of 220 is Vbe2×N (Vbe2 times N). This produces a VREF curve in FIG. 2a, which has a steeper slope than the VREF curve in FIG. 1a. In FIG. 2a, VREF equals Vbe2×N. If a steeper VREF curve is needed in FIG. 2a, a larger N is chosen. This will result in a different choice of resistor values for R4 and R5.

Increasing the slope of the reference voltage, VREF, causes a more accurate, clearly defined temperature measurement. Also, in FIG. 2c, the steeper slope, allows the circuit of FIG. 2c to be more insensitive to process variations which vary resistor values.

FIG. 2a shows a diagram of voltage versus temperature. FIG. 2a graphs voltage versus temperature for 4 nodes pictured in the circuit of FIG. 2c. As shown in FIG. 2a, the intersection of the VR1' straight-line graph and the Vbe2×N curve occurs at temperature, T1. VR1' is the voltage at the top node of resistor, R1' in FIG. 2c. Vbe2 is the voltage across transistor, Q2. The size of transistor Q2 is larger than the size of transistor Q1 by a factor of M:1, where M>1. This allows the resistance of Q2 to be less than that of Q1. This provides for a controllable voltage drop across resistor Rbe. Resistor Rbe can be changed to regulate the desired Vbe2 reference voltage. Voltage, Vbe2×N, is the reference voltage, VREF=Vbe2×N, in FIG. 2c. VR2' is the voltage at the top node of resistor, R2', in FIG. 2c.

FIG. 2c shows Vbe2×N and VR1' as inputs to a comparator A1. FIG. 2c shows Vbe2×N and VR2' as inputs to a comparator A2. FIG. 2c shows Vbe2×N and VR3' as inputs to a comparator A3. VR3' is the voltage at the top node of resistor, R3', in FIG. 2c.

Referring to FIG. 2c, the derivation of the temperature dependence of voltages VR1', VR2' and VR3' is as follows.

$$Iq1=Iq2=Ir=I$$

To insure that the above currents are equal, the following device sizes are required.

$$(W/L)_{P1}=(W/L)_{P2}=(W/L)_{P3}$$

where (W/L) is a field effect transistor (FET) width to length ratio, where P1, P2, P3 are the FETs shown in FIG. 2c.

$$Vbe1=I*Rbe+Vbe2$$

$$I=(Vbe1-Vbe2)/Rbe=[(k*T/q)*ln(I/Is1)-(k*T/q)*ln(I/Is2)]/Rbe$$

$$I=[(k*T/q)*ln(Is2/Is1)]/Rbe=[(k*T/q)*ln(M)]/Rbe$$

$$VR1'=I*(R1'+R2'+R3')=[(k*T/q)*ln(M)]*(R1'+R2'+R3')/Rbe$$

$$VR2'=I*(R2'+R3')=[(k*T/q)*ln(M)]*(R2'+R3')/Rbe$$

$$VR3'=I*(R3')=[(k*T/q)*ln(M)]*(R3')/Rbe$$

In FIG. 2a, if VR1' is larger than Vbe2×N, then VT1 will be non-zero. A non-zero VT1 indicates that the circuit of FIG. 2c detected a temperature range above T1 as shown in FIG. 2b.

In FIG. 2a, if VR2' is larger than Vbe2×N, then VT2 will be non-zero. A non-zero VT2 indicates that the circuit of FIG. 2c detected a temperature range above T2 as shown in FIG. 2b.

In FIG. 2a, if VR3' is larger than Vbe2×N, then VT3 will be non-zero. A non-zero VT3 indicates that the circuit of FIG. 2c detected a temperature range above T3 as shown in FIG. 2b.

Figure 3:
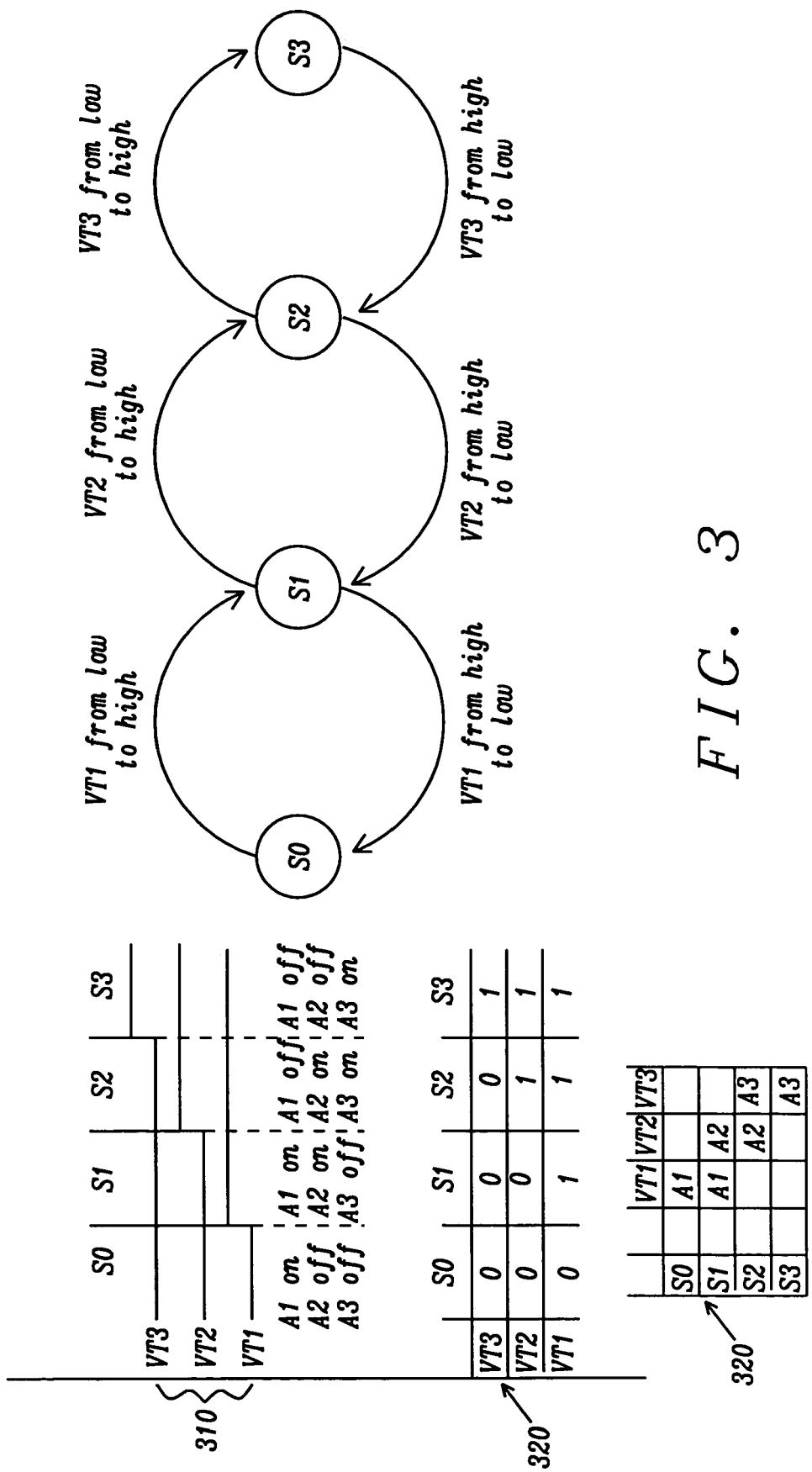
FIG. 3 shows a state diagram which describes the control of the circuit of FIG. 2c.

FIG. 3 shows a state diagram representation of the operation of the circuit in FIG. 2c. The state diagram shown represents the case of four temperature states (S0, S1, S2, S3) or equivalently three temperatures (T1, T2, T3) being measured. The number of states in the state diagram (S0, S1, S2, S3) is equal to K+1 where K=the number of temperatures being measured. The different states indicate different temperature windows. Based on the determination of different states (S1, S2, S3 or S4), the proposed temperature sensor can detect different temperature windows. Based on the determination of the transitions of VT1, VT2, or VT3, the proposed temperature sensor can detect an exact temperature. In FIG. 3, state 0 represents the starting temperature state. It is assumed that the temperatures increase in value from the starting temperature state S0 to S1 to S2 to S3. The voltage graphs 310 show the progression from state S0 to S1 to S2 to S3. VT1, VT2 and VT3 are all low during S0. VT1 is high during S1, VT2 and VT1 are high during S2, and VT3, VT2, and VT1 are high during S3. In FIG. 3, the graph 310 shows that comparator A1 from FIG. 2C is ON during state S0. Comparators A1 and A2 are ON during state S1. Comparators A2 and A3 are ON during state S2. Comparator A3 is ON during state S3. The above information tells us that at most only two comparators are ON at any given time. This fact about only two comparators ON will be developed further in FIG. 4.

In FIG. 3, the transition from state S0 to state S1 is caused by the VT1 transited from low to high. Recall from FIG. 2b that the VT1 signal will transit from low to high when the temperature on the integrated circuit chip goes from below T1 to above T1. This is detected when VR1' greater than or equal to VREF in FIG. 2a. This inequality is detected in the circuit of FIG. 2c at comparator A1. The comparator functions as follows. If VR1' is less than VREF, then VT1=low. If VR1' is greater than or equal to VREF, then VT1=high.

In FIG. 3, the transition from state S1 to state S2 is triggered by the VT2 transited from low to high. Recall from FIG. 2b that the VT2 signal will transit from low to high when the temperature on the integrated circuit chip goes from below T2 to above T2. This is detected when VR2' is greater than or equal to VREF in FIG. 2a. This inequality is detected in the circuit of FIG. 2c at comparator A2.

In FIG. 3, the transition from state S2 to state S3 is triggered by the VT3 transited from low to high. Recall from FIG. 2b that the VT3 signal will transit from low to high when the temperature on the integrated circuit chip goes from below T3 to above T3. This is detected when VR3' is greater than or equal to VREF in FIG. 2a. This inequality is detected in the circuit of FIG. 2c at comparator A3.

In FIG. 3, the transition from state S3 to state S2 is triggered by the VT3 transited from high to low. Recall from FIG. 2b that the VT3 signal will transit from high to low when the temperature on the integrated circuit chip goes from above T3 to below T3. This is detected when VR3' is less than VREF in FIG. 2a. This inequality is detected in the circuit of FIG. 2c at comparator A3.

In FIG. 3, the transition from state S2 to state S1 is triggered by the VT2 transited from high to low. Recall from FIG. 2b that the VT2 signal will transit from high to low when the temperature on the integrated circuit chip goes from above T2 to below T2. This is detected when VR2' is less than VREF in FIG. 2a. This inequality is detected in the circuit of FIG. 2c at comparator A2.

In FIG. 3, the transition from state S1 to state S0 is triggered by the VT1 transited from high to low. Recall from FIG. 2a that the VT1 signal will transit from high to low when the temperature on the integrated circuit chip goes below temperature T1. This is detected when VR1' is less than VREF in FIG. 2a. This inequality is detected in the circuit of FIG. 2c at comparator A1.

Figure 4A:
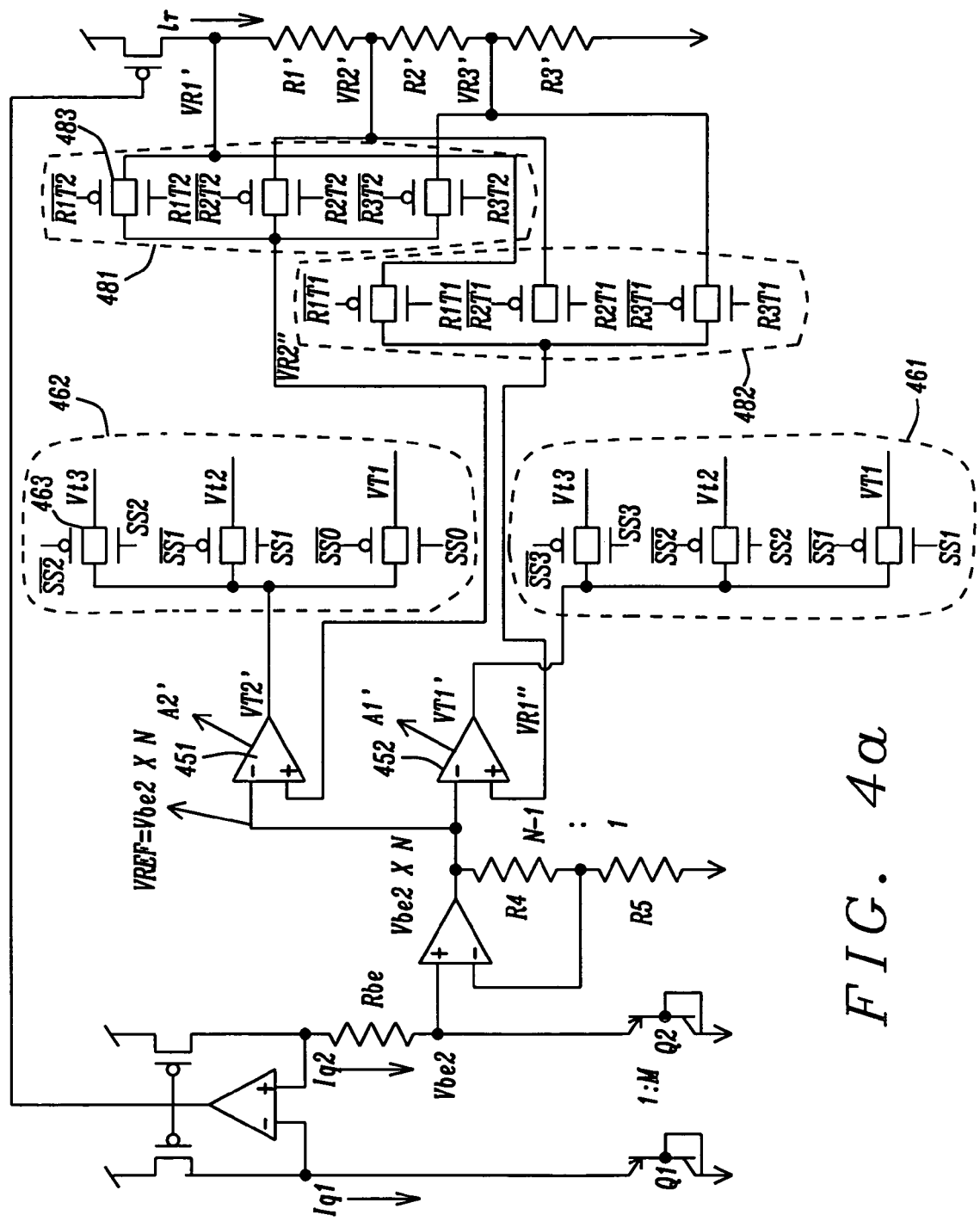
FIG. 4a shows a circuit which is the second embodiment of this invention.

FIG. 4a shows a second embodiment of this invention. The circuit of FIG. 4a is similar to the circuit of FIG. 2c. It has implemented two comparators A1' and A2' 451, 452 instead of three A1, A2, A3 as shown in FIG. 2c. The circuit of FIG. 4a has two added groups of devices 481, 482.

Circuit groups 481 and 482 have three complementary metal oxide semiconductor, CMOS, pass gates which are each implemented by parallel N-channel metal oxide semiconductor (NMOS) and P-channel metal oxide semiconductor (PMOS) field effect transistor (FET) transfer gates. Similarly, the control signals on these gates are complements of each other. The drains of the pass gates in circuit groups 481 and 482 are attached in common to nodes labeled VR1" and VR2" which go to the plus input of the A1' and A2' voltage comparators 451 and 452 respectively. The sources of the pass gates in FIG. 4a are attached to voltages VR1', VR2', and VR3'.

In addition, the circuit of FIG. 4a has two more added groups of devices 461, 462. Circuit groups 461 and 462 have three complementary metal oxide semiconductor, CMOS, pass gates which are each implemented by parallel N-channel metal oxide semiconductor (NMOS) and P-channel metal oxide semiconductor (PMOS) field effect transistor (FET) transfer gates. Similarly, the control signals on these gates are complements of each other. The drains of the pass gates in circuit groups 461 and 462 are attached in common to nodes labeled VT1' and VT2' which come from the outputs of the A1' and A2' voltage comparators 452 and 451 respectively. The sources of the pass gates in FIG. 4a are attached to voltages VT1, VT2, and VT3.

The added groups of devices 481, 482 are used to control the selective feedback of voltages VR1', VR2', and VR3'. The devices in groups 481, 482 connect to the inputs of comparators A1' and A2', the inputs which are required to be valid during the various states S0, S1, S2 and S3. The chart 471 shown in FIG. 4b illustrates which comparators from FIG. 2c are replaced by comparators A1' and A2'. For example, during state S1, comparator A1' replaces comparator A1 and comparator A2' replaces comparator A2. In chart 471 of FIG. 4b, during state S2, comparator A1' replaces comparator A2, and comparator A2' replaces comparator A3.

FIG. 4b shows table 475 which shows the state of the control signals on the gate nodes of pass gates in circuit groups 461 and 462. The levels shown for SS0, SS1, SS2 and SS3 in table 475 are required to produce the resulting signals on the source nodes of the pass gates shown in table 472 of FIG. 4b.

Similarly, chart 472 of FIG. 4b is derived from chart 471. Chart 472 shows that in state S2, voltage VT1' represents voltage VT2, and voltage VT2' represents voltage VT3. The VT1, VT2, and VT3 in FIG. 4b are identical to the VT1, VT2, and VT3 in FIG. 2c. In FIG. 4b, chart 473 shows the required control signal activations necessary to achieve the innovative use of two comparators shown in charts 471 and 472. The activations of chart 473 result in the selective placement of VR1", VR2".

Figure 5:
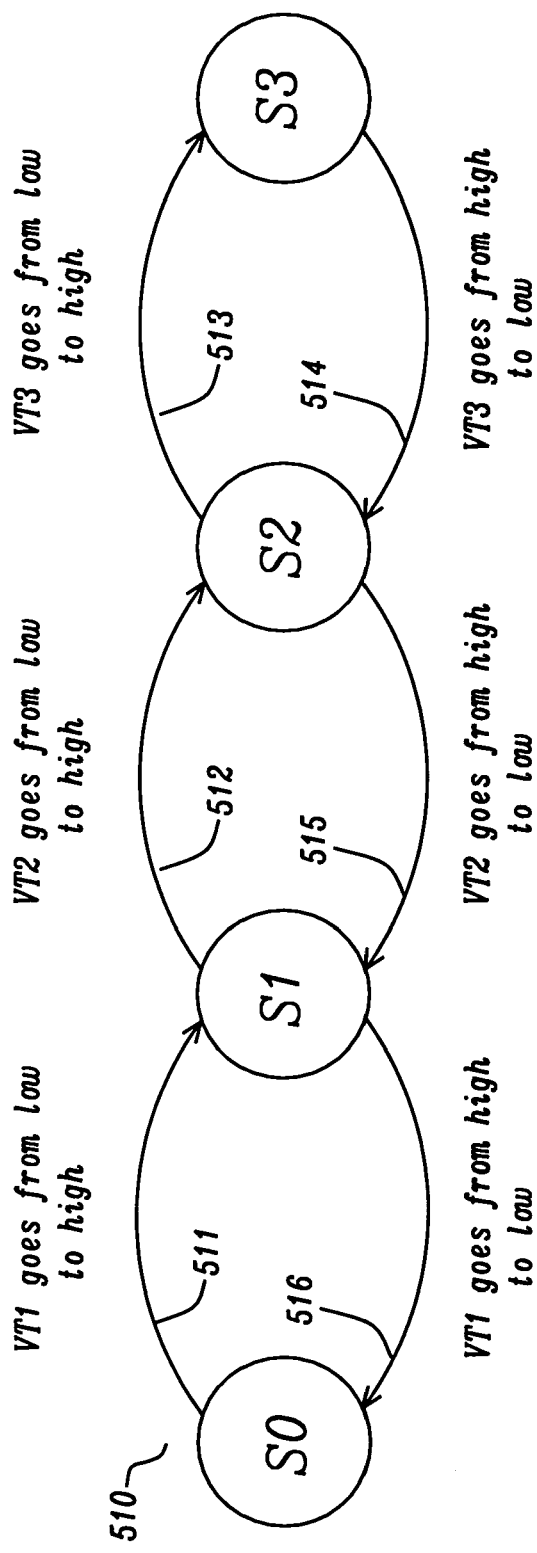
FIG. 5 shows a state diagram which describes the control of the circuit of FIG. 4.

FIG. 5 shows a state diagram 510, which describes the operation of the circuit of FIG. 4. The above six unique state transitions provide the ability for the temperature sensor circuitry of and integrated circuit of this invention to uniquely identify the temperature represented by state S0, S1, S2 or S3.

In FIG. 5, we notice that there are 4 states (S0, S1, S2 and S3) to represent 3 temperatures (T1, T2, and T3). In general, n+1 states are required to represent n different temperatures. In addition, in the circuit of FIG. 4, there are 'n' pass gates or transfer gates per circuit grouping such as 461 and 462. For example, to measure 100 different temperatures, the design calls for 101 states. To simplify the pass gate design and capacitive loading due to the multiplicity of FET devices such as 463 in FIG. 4, the design would likely use 2 comparators for every 11 states to limit the number of pass gates to 10 devices per group such as 461 or 462. Ten different temperatures need 11 states to identify them.

In FIG. 5, state S0 has A1' in Off, A2' is On. This results in VT1 being low, unlatched since A2' determines VT1. It also results in VT2 and VT3 being low. VT2 and VT3 need to be latched, since there is no driver to detect VT2 and VT3 in state S0.

In FIG. 5, state S1 has A1' in On, A2' is On. This results in VT1 being high and VT2 being low, unlatched since A1' determines VT1 and A2' determines VT2. VT3 needs to be latched, since there is no driver to detect VT3 in state S1. In FIG. 5, state S2 has A1' in On, A2' is On. This results in VT2 being high and VT3 being low, unlatched since A1' determines VT2 and A2' determines VT3. VT1 needs to be latched, since there is no driver to detect VT1 in state S2. In FIG. 5, state S3 has A1' in On, A2' is Off. This results in VT3 being high, unlatched since A1' determines VT3. It also results in VT1 and VT2 being high. VT1 and VT2 need to be latched, since there is no driver to detect VT1 and VT2 in state S3.

These VT1, VT2, and VT3 values can be evaluated any time to determine which state the circuit is in. For example, in S1, the driver of VT1 is A1' and the driver of VT2 is A2'. The value of VT3 should be latched to low, because there is no driver for VT3 in state S1. When A1' detects VT1 having a transition from high to low in state S1, the state will change from S1 to S0. Then the VT1' driver would change from A1' to A2', and A1' would turn off and the values of VT2 and VT3 would be latched low because there is no driver of VT2 and VT3 in state S0. When A2' detects VT2 having a transition from low to high in state S1, the state would change from S1 to S2. The driver of VT2 is changed from A2' to A1', VT3 is no longer latched, A2' would be the driver of VT3 and VT1 is latched to high, because there is no driver of VT1 in state S2. In FIG. 5, the waveform of 520 and the table of 530 show the transitions of VT1, VT2, and VT3 during states S0, S1, S2 and S3. Table 540 summarizes the state of A1' and A2' during the states. For example, in state S0, the driver of VT1 is A2'. In state S1, the driver of VT1 is A1' and the driver of VT2 is A2'. In state S2, the driver of VT2 is A1' and the driver of VT3 is A2'. In state S3, the driver of VT3 is A1' and A2' is off.

In FIG. 5, during the transition from state S0 to state S1, VT1 goes from low to high. During the transition from state S1 to state S2, VT2 goes from low to high. During the transition from state S2 to state S3, VT3 goes from low to high. During the transition from state S3 to state S2, VT3 goes from high to low. During the transition from state S2 to state S1, VT2 goes from high to low. During the transition from state S1 to state S0, VT1 goes from high to low.

Figure 6:
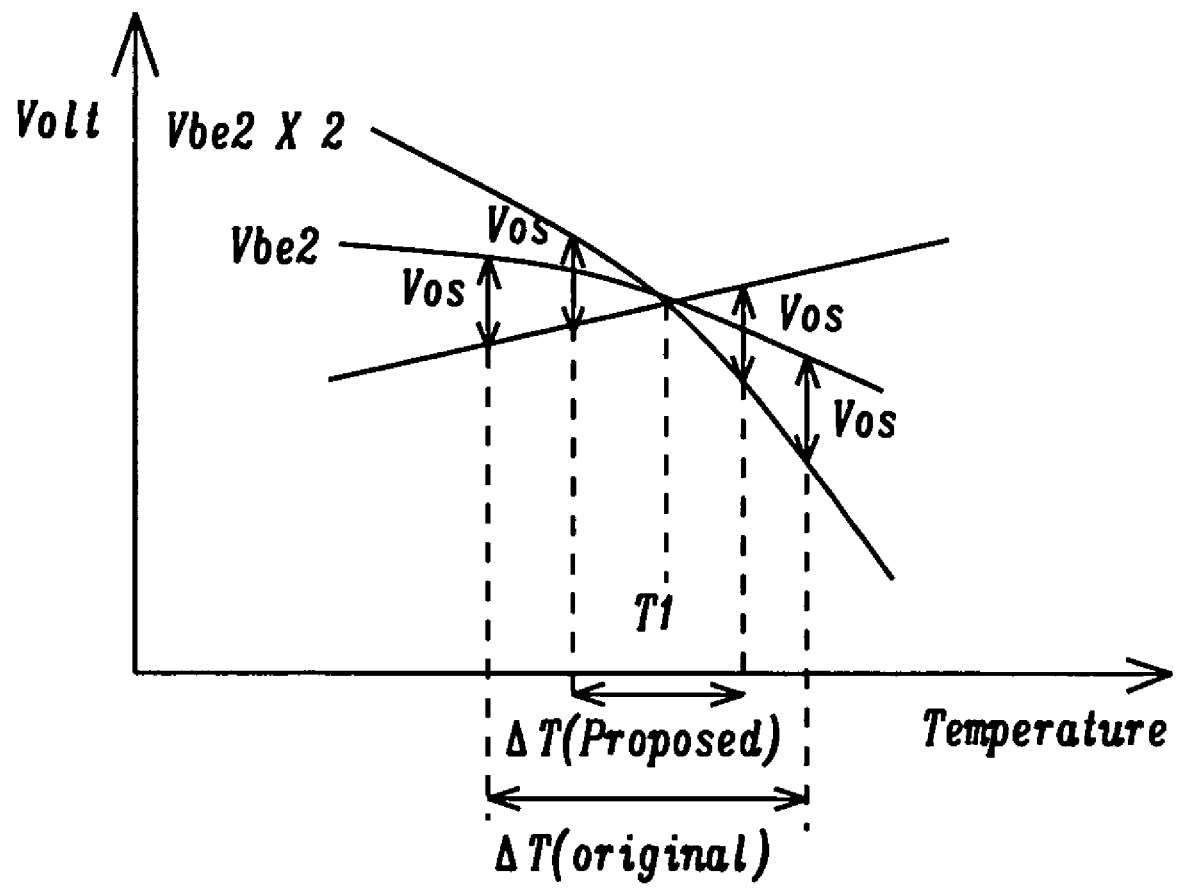
FIG. 6 is a voltage vs. temperature graph showing intersection of a resistor voltage and a two different reference voltages for the first and second embodiments.

FIG. 6 shows how the present invention is more accurate than the proposed basic temperature sensor in FIG. 1c. In FIG. 6, T1 is the temperature determined by an ideal comparator, which has no offset voltage. Delta T is the variation of the temperature determined by a real-life comparator, which has non-ideal factors, which cause to offset voltage, Vos. Since the present invention has a reference voltage equal to Vbe×2 which is twice the prior art reference voltage of Vbe.

In FIG. 6, the slope of Vbe×2 is twice the slope of Vbe. This steeper slope allows the present invention to be more accurate than the proposed basic temperature sensor in FIG. 1c. FIG. 6 shows the temperature variation delta T proposed to be less than delta T original. From the above analysis of FIG. 6, we see that the proposed invention has a smaller temperature variation than the proposed basic temperature sensor in FIG. 1c. The present invention is more accurate and more insensitive to non-ideal factors.

The advantages of this invention are that this temperature sensor is more accurate than other temperature sensors, since it uses a reference voltage which has a steeper slope versus temperature. Also, this temperature sensor dissipates lower power than conventional designs, since it only requires two voltage comparators. This is accomplished via a unique transfer gate voltage selection system, which allows two comparators to be reused during different temperature control state modes. The simple design can be scaled to add to the number of temperatures to be detected.

While the invention has been described in terms of the preferred embodiments, those skilled in the art will recognize that various changes in form and details may be made without departing from the spirit and scope of the invention.

What is claimed is:

1. A low power, small area temperature sensor circuit comprising:
    a current mirror reference circuit which produces a reference voltage,
    an amplifier for reference voltage multiplying said reference voltage wherein said amplifier outputs a multiplied reference voltage,
    a bank of voltage comparators wherein said multiplied reference voltage provides a minus input to said voltage comparators,
    a current mirror output circuit which generates multiple voltage levels each of which are plus inputs to said voltage comparators.

2. The low power, small area temperature sensor circuit of claim 1 wherein said current mirror reference circuit is comprised of:
    a first bipolar transistor connected as a diode with a base and a collector connected in common to ground,
    a second bipolar transistor connected as a diode with a base and a collector connected in common to ground, wherein said second bipolar transistor has an area which is M times an area of said first bipolar transistor, where M is greater than one,
    an amplifier whose minus input is connected to an emitter of said first bipolar transistor and whose plus input is connected to a first node of and input resistor whose second node is connected to an emitter a second transistor of said two bipolar transistors,
    three p-channel metal oxide semiconductor field effect transistors, PMOS FETs whose sources are connected to a power supply and whose gates are connected to an output of said amplifier, wherein said common gate connection allows said three PMOS FETS to have identical current flow, wherein a first PMOS FET of said three PMOS FETS has its drain connected to said emitter of said first bipolar transistor, and a second PMOS FET of said three PMOS FETS has its drain connected to said first node of said input resistor and a third PMOS FET of said three PMOS FETS has its drain connected to a first node of a first output resistor located in an output current mirror circuit branch.

3. The low power, small area temperature sensor circuit of claim 2 wherein said reference voltage amplifier has a plus input connected to said second node of said input resistor, and said reference voltage amplifier has a minus input connected to a first node of a first reference voltage amplifier resistor, whose second node is connected to ground, wherein said reference voltage amplifier has an output which is connected to a first node of a second reference voltage amplifier resistor, whose second node is connected to said first node of said first reference voltage resistor, wherein if an amplification multiplier for said reference voltage amplifier is N and assuming said first reference voltage amplifier resistor is represented by 1, then said second reference voltage amplifier resistor would be represented by N−1.

4. The low power, small area temperature sensor circuit of claim 3 wherein said bank of voltage comparators is comprised of:
  a first voltage comparator whose minus input is said output of said reference voltage amplifier and whose plus input is from said first node of said first output resistor, and whose output is transited and indicates a lowest absolute temperature has been detected,
  a second voltage comparator whose minus input is said output of said reference voltage amplifier and whose plus input is from said first node of said second output resistor, and whose output is transited and indicates a second lowest absolute temperature has been detected,
  a third voltage comparator whose minus input is said output of said reference voltage amplifier and whose plus input is from said first node of said third output resistor, and whose output is transited and indicates a third lowest absolute temperature has been detected.

5. The low power, small area temperature sensor circuit of claim 4 wherein said current mirror output circuit is comprised of said third PMOS FET of said three PMOS FETS whose drain is connected to said first node of said first output resistor, wherein said second output resistor has a second node connected to a first node of a third output resistor, wherein a second node of said third output resistor is connected to ground.

6. The low power, small area temperature sensor circuit of claim 5 wherein a voltage at said first node of said first output resistor is directly proportional to said lowest absolute temperature of a semiconductor die containing said temperature sensor circuit and wherein a voltage at said first node of said second output resistor is directly proportional to said second lowest absolute temperature of said semiconductor die containing said temperature sensor circuit, and wherein a voltage at said first node of said third output resistor is directly proportional to said third lowest absolute temperature of said semiconductor die containing said temperature sensor circuit.

7. A low power, small area temperature sensor circuit comprising:
  a current mirror reference circuit which produces a reference voltage,
  an amplifier for reference voltage multiplying said reference voltage wherein said amplifier outputs a multiplied reference voltage,
  a pair of voltage comparators wherein said multiplied reference voltage provides a minus input to said voltage comparators,
  a current mirror output circuit which generates multiple voltage levels each of which are plus inputs to said voltage comparators,
  a first group of three transfer gate FETs which selectively connect different output voltage levels to a plus input of a first voltage comparator of said pair of voltage comparators, and
  a second group of three transfer gate FETs which selectively connect different output voltage levels to a plus input of a second voltage comparator of said pair of voltage comparators.

8. The low power, small area temperature sensor circuit of claim 7 wherein said current mirror reference circuit is comprised of:
  a first bipolar transistor connected as a diode with a base and a collector connected in common to ground,
  a second bipolar transistor connected as a diode with a base and a collector connected in common to ground, wherein said second bipolar transistor has an area which is M times an area of said first bipolar transistor, where M is greater than one,
  an amplifier whose minus input is connected to an emitter of said first bipolar transistor and whose plus input is connected to a first node of and input resistor whose second node is connected to an emitter a second transistor of said two bipolar transistors,
  three p-channel metal oxide semiconductor field effect transistors, PMOS FETs whose sources are connected to a power supply and whose gates are connected to an output of said amplifier, wherein said common gate connection allows said three PMOS FETS to have identical current flow, wherein a first PMOS FET of said three PMOS FETS has its drain connected to said emitter of said first bipolar transistor, and a second PMOS FET of said three PMOS FETS has its drain connected to said first node of said input resistor and a third PMOS FET of said three PMOS FETS has its drain connected to a first node of a first output resistor located in an output current mirror circuit branch.

9. The low power, small area temperature sensor circuit of claim 8 wherein said reference voltage amplifier has a plus input connected to said second node of said input resistor, and said reference voltage amplifier has a minus input connected to a first node of a first reference voltage amplifier resistor, whose second node is connected to ground, wherein said reference voltage amplifier has an output which is connected to a first node of a second reference voltage amplifier resistor, whose second node is connected to said first node of said first reference voltage resistor, wherein if an amplification multiplier for said reference voltage amplifier is N and assuming said first reference voltage amplifier resistor is represented by 1, then said second reference voltage amplifier resistor would be represented by N−1.

10. The low power, small area temperature sensor circuit of claim 9 wherein said pair of voltage comparators is comprised of:
  a first voltage comparator whose minus input is said output of said reference voltage amplifier and whose plus input is from said first group of transfer gate FETs, which connect said first node of said first output resistor or said first node of said second output resistor or said first node of said third output resistor, depending on said state control mode, and whose output is latched and whose level and transitions are used in combination with said state control mode to determine an absolute temperature level,
  a second voltage comparator whose minus input is said output of said reference voltage amplifier and whose plus input is from said second group of transfer gate FETs, which connect said first node of said first output resistor or said first node of said second output resistor or said first node of said third output resistor, depending on said state control mode, and whose output is latched and whose level and transitions are used in combination with said state control mode to determine an absolute temperature level.

11. The low power, small area temperature sensor circuit of claim 10 wherein said current mirror output circuit is comprised of said third PMOS FET of said three PMOS FETS whose drain is connected to said first node of said first output resistor, wherein said second output resistor has a second node connected to a first node of a third output resistor, wherein a second node of said third output resistor is connected to ground.

12. The low power, small area temperature sensor circuit of claim 11 wherein a voltage at said first node of said first output resistor is directly proportional to said lowest absolute temperature of a semiconductor die containing said temperature sensor circuit and wherein a voltage at said first node of said second output resistor is directly proportional to said second lowest absolute temperature of said semiconductor die containing said temperature sensor circuit, and wherein a voltage at said first node of said third output resistor is directly proportional to said third lowest absolute temperature of said semiconductor die containing said temperature sensor circuit.

13. The low power, small area temperature sensor circuit of claim 12, wherein said first group of three transfer gate FETs have their drains connected in common to a plus input of said first voltage comparator of said pair of voltage comparators, wherein said said first group of three transfer gate FETs have their sources connected to said first node of said first output resistor, to said first node of said second output resistor, and to said first node of said third output resistor respectively, and wherein said first group of three transfer gate FETs have their gates connected to control signals derived from said state control modes.

14. The low power, small area temperature sensor circuit of claim 13, wherein a number of absolute temperatures to be detected can be added by adding one said output resistor and one said transfer gate FET for each said absolute temperature to be detected.

15. The low power, small area temperature sensor circuit of claim 14, wherein a number of said state control modes is equal to said number of temperatures to be detected plus one.

16. The low power, small area temperature sensor circuit of claim 15, wherein said pair of voltage comparators are duplicated as said number of temperatures to be detected is increased beyond a circuit loading limitation of said transfer gate FETs.

17. A method of sensing integrated circuit temperatures using low power and small area comprising the steps of:
  producing a reference voltage using a current mirror reference circuit,
  multiplying said reference voltage using an amplifier,
  providing a bank of voltage comparators wherein said multiplied reference voltage provides a minus input to said voltage comparators, and
  providing a current mirror output circuit which generates multiple voltage levels each of which are plus inputs to said voltage comparators.

18. The method of sensing integrated circuit temperatures using low power and small area of claim 17 wherein said current mirror reference circuit is comprised of:
  a first bipolar transistor connected as a diode with a base and a collector connected in common to ground,
  a second bipolar transistor connected as a diode with a base and a collector connected in common to ground, wherein said second bipolar transistor has an area which is M times an area of said first bipolar transistor, where M is greater than one,
  an amplifier whose minus input is connected to an emitter of said first bipolar transistor and whose plus input is connected to a first node of and input resistor whose second node is connected to an emitter a second transistor of said two bipolar transistors,
  three p-channel metal oxide semiconductor field effect transistors, PMOS FETs whose sources are connected to a power supply and whose gates are connected to an output of said amplifier, wherein said common gate connection allows said three PMOS FETS to have identical current flow, wherein a first PMOS FET of said three PMOS FETS has its drain connected to said emitter of said first bipolar transistor, and a second PMOS FET of said three PMOS FETS has its drain connected to said first node of said input resistor and a third PMOS FET of said three PMOS FETS has its drain connected to a first node of a first output resistor located in an output current mirror circuit branch.

19. The method of sensing integrated circuit temperatures using low power and small area of claim 18 wherein said reference voltage amplifier has a plus input connected to said second node of said input resistor, and said reference voltage amplifier has a minus input connected to a first node of a first reference voltage amplifier resistor, whose second node is connected to ground, wherein said reference voltage amplifier has an output which is connected to a first node of a second reference voltage amplifier resistor, whose second node is connected to said first node of said first reference voltage resistor, wherein if an amplification multiplier for said reference voltage amplifier is N and assuming said first reference voltage amplifier resistor is represented by 1, then said second reference voltage amplifier resistor would be represented by N−1.

20. The method of sensing integrated circuit temperatures using low power and small area of claim 19 wherein said bank of voltage comparators is comprised of:
  a first voltage comparator whose minus input is said output of said reference voltage amplifier and whose plus input is from said first node of said first output resistor, and whose output is transited and indicates a lowest absolute temperature has been detected,
  a second voltage comparator whose minus input is said output of said reference voltage amplifier and whose plus input is from said first node of said second output resistor, and whose output is transited and indicates a second lowest absolute temperature has been detected,
  a third voltage comparator whose minus input is said output of said reference voltage amplifier and whose plus input is from said first node of said third output resistor, and whose output is transited and indicates a third lowest absolute temperature has been detected.

21. The method of sensing integrated circuit temperatures using low power and small area of claim 20 wherein said current mirror output circuit is comprised of said third PMOS FET of said three PMOS FETS whose drain is connected to said first node of said first output resistor, wherein said second output resistor has a second node connected to a first node of a third output resistor, wherein a second node of said third output resistor is connected to ground.

22. The method of sensing integrated circuit temperatures using low power and small area of claim 21 wherein a voltage at said first node of said first output resistor is directly proportional to said lowest absolute temperature of a semiconductor die containing said temperature sensor circuit and wherein a voltage at said first node of said second output resistor is directly proportional to said second lowest absolute temperature of said semiconductor die containing said temperature sensor circuit, and wherein a voltage at said first node of said third output resistor is directly proportional to said third lowest absolute temperature of said semiconductor die containing said temperature sensor circuit.

23. A method of sensing integrated circuit temperatures using low power and small area comprising the steps of:
producing a reference voltage using a current mirror reference circuit,
multiplying said reference voltage using an amplifier,
providing a pair of voltage comparators wherein said multiplied reference voltage provides a minus input to said voltage comparators,
providing a current mirror output circuit which generates multiple voltage levels each of which are plus inputs to said voltage comparators,
providing a first group of three transfer gate FETs which selectively connect different output voltage levels to a plus input of a first voltage comparator of said pair of voltage comparators, and
providing a second group of three transfer gate FETs which selectively connect different output voltage levels to a plus input of a second voltage comparator of said pair of voltage comparators.

24. The method of sensing integrated circuit temperatures using low power and small area of claim 23 wherein said current mirror reference circuit is comprised of:
a first bipolar transistor connected as a diode with a base and a collector connected in common to ground,
a second bipolar transistor connected as a diode with a base and a collector connected in common to ground, wherein said second bipolar transistor has an area which is M times an area of said first bipolar transistor, where M is greater than one,
an amplifier whose minus input is connected to an emitter of said first bipolar transistor and whose plus input is connected to a first node of and input resistor whose second node is connected to an emitter a second transistor of said two bipolar transistors,
three p-channel metal oxide semiconductor field effect transistors, PMOS FETs whose sources are connected to a power supply and whose gates are connected to an output of said amplifier, wherein said common gate connection allows said three PMOS FETS to have identical current flow, wherein a first PMOS FET of said three PMOS FETS has its drain connected to said emitter of said first bipolar transistor, and a second PMOS FET of said three PMOS FETS has its drain connected to said first node of said input resistor and a third PMOS FET of said three PMOS FETS has its drain connected to a first node of a first output resistor located in an output current mirror circuit branch.

25. The method of sensing integrated circuit temperatures using low power and small area of claim 24 wherein said reference voltage amplifier has a plus input connected to said second node of said input resistor, and said reference voltage amplifier has a minus input connected to a first node of a first reference voltage amplifier resistor, whose second node is connected to ground, wherein said reference voltage amplifier has an output which is connected to a first node of a second reference voltage amplifier resistor, whose second node is connected to said first node of said first reference voltage resistor, wherein if an amplification multiplier for said reference voltage amplifier is N and assuming said first reference voltage amplifier resistor is represented by 1, then said second reference voltage amplifier resistor would be represented by N−1.

26. The method of sensing integrated circuit temperatures using low power and small area of claim 25 wherein said pair of voltage comparators is comprised of:
a first voltage comparator whose minus input is said output of said reference voltage amplifier and whose plus input is from said first group of transfer gate FETs, which connect said first node of said first output resistor or said first node of said second output resistor or said first node of said third output resistor, depending on said state control mode, and whose output is latched and whose level and transitions are used in combination with said state control mode to determine an absolute temperature level,
a second voltage comparator whose minus input is said output of said reference voltage amplifier and whose plus input is from said second group of transfer gate FETs, which connect said first node of said first output resistor or said first node of said second output resistor or said first node of said third output resistor, depending on said state control mode, and whose output is latched and whose level and transitions are used in combination with said state control mode to determine an absolute temperature level.

27. The method of sensing integrated circuit temperatures using low power and small area of claim 26 wherein said current mirror output circuit is comprised of said third PMOS FET of said three PMOS FETS whose drain is connected to said first node of said first output resistor, wherein said second output resistor has a second node connected to a first node of a third output resistor, wherein a second node of said third output resistor is connected to ground.

28. The method of sensing integrated circuit temperatures using low power and small area of claim 27 wherein a voltage at said first node of said first output resistor is directly proportional to said lowest absolute temperature of a semiconductor die containing said temperature sensor circuit and wherein a voltage at said first node of said second output resistor is directly proportional to said second lowest absolute temperature of said semiconductor die containing said temperature sensor circuit, and wherein a voltage at said first node of said third output resistor is directly proportional to said third lowest absolute temperature of said semiconductor die containing said temperature sensor circuit.

29. The method of sensing integrated circuit temperatures using low power and small area of claim 28, wherein said first group of three transfer gate FETs have their drains connected in common to a plus input of said first voltage comparator of said pair of voltage comparators, wherein said first group of three transfer gate FETs have their sources connected to said first node of said first output resistor, to said first node of said second output resistor, and to said first node of said third output resistor respectively, and wherein said first group of three transfer gate FETs have their gates connected to control signals derived from said state control modes.

30. The method of sensing integrated circuit temperatures using low power and small area of claim 29, wherein a number of absolute temperatures to be detected can be added by adding one said output resistor and one said transfer gate FET for each said absolute temperature to be detected.

31. The method of sensing integrated circuit temperatures using low power and small area of claim 30, wherein a number of said state control modes is equal to said number of temperatures to be detected plus one.

32. The method of sensing integrated circuit temperatures using low power and small area of claim 31, wherein said pair of voltage comparators are duplicated as said number of temperatures to be detected is increased beyond a circuit loading limitation of said transfer gate FETs.

* * * * *